(12) United States Patent
Gordon et al.

(10) Patent No.: US 7,971,560 B2
(45) Date of Patent: Jul. 5, 2011

(54) CONDENSATION DRAINING SYSTEM FOR CONDENSING WATER HEATERS

(75) Inventors: Michael W. Gordon, East Grand Rapids, MI (US); Ryan Ritsema, Middleville, MI (US)

(73) Assignee: Bradford White Corporation, Ambler, PA (US)

( * ) Notice: Subject to any disclaimer, the term of this patent is extended or adjusted under 35 U.S.C. 154(b) by 643 days.

(21) Appl. No.: 12/051,454

(22) Filed: Mar. 19, 2008

(65) Prior Publication Data

US 2009/0235875 A1 Sep. 24, 2009

(51) Int. Cl.
*F24D 19/08* (2006.01)

(52) U.S. Cl. .................................. 122/15.1; 122/18.1

(58) Field of Classification Search ............... 122/15.1, 122/18.1, 59, 169, 249, 250 R
See application file for complete search history.

(56) References Cited

U.S. PATENT DOCUMENTS

| | | | |
|---|---|---|---|
| RE23,494 E * | 5/1952 | Esnault-Pelterie | ........... 122/169 |
| 4,448,136 A | 5/1984 | White | |
| 4,699,122 A | 10/1987 | Jannemann et al. | |
| 4,846,150 A | 7/1989 | Maton | |
| 4,947,983 A * | 8/1990 | Jost | ............... 202/163 |
| 5,199,385 A | 4/1993 | Doss | |
| 5,339,755 A | 8/1994 | Smith | |
| 5,546,760 A * | 8/1996 | Cook et al. | ....................... 62/497 |
| 5,735,237 A * | 4/1998 | Phillip et al. | ................. 122/18.5 |
| 5,775,268 A | 7/1998 | Ferguson | |
| 6,044,803 A | 4/2000 | Hamos et al. | |
| 6,095,238 A | 8/2000 | Kawano et al. | |
| 6,536,378 B2 | 3/2003 | Lynons | |
| 7,258,080 B2 * | 8/2007 | Missou et al. | ............ 122/18.1 |
| 7,415,943 B2 * | 8/2008 | Missou et al. | ............ 122/18.1 |
| 2009/0050077 A1 * | 2/2009 | Kim et al. | ..................... 122/15.1 |

* cited by examiner

*Primary Examiner* — Gregory A Wilson
(74) *Attorney, Agent, or Firm* — RatnerPrestia

(57) ABSTRACT

A system and method for configuring a water heater to drain condensate from combustion products is provided. The water heater comprises a water tank, a burner for producing combustion products, a flue extending through an interior of the water tank to receive the combustion products, and an exhaust passageway positioned downstream of the flue and extending outside of the water tank to exhaust the combustion products. The exhaust passageway includes a first portion and a second portion positioned at an elevation above the first portion. A bypass conduit is coupled to the exhaust passageway and positioned to direct condensate in the exhaust passageway from the second portion toward the first portion. A drain port is positioned at or an elevation below the first portion of the exhaust passageway to drain condensate from the exhaust passageway.

24 Claims, 3 Drawing Sheets

CONDENSATION DRAINING SYSTEM FOR CONDENSING WATER HEATERS

FIELD OF THE INVENTION

The present invention relates to a high efficiency water heater having a condensate disposal system and a method of draining condensate from a condensing water heater.

BACKGROUND OF THE INVENTION

Commercial and residential water heaters typically heat water by generating tens of thousands, and even hundreds of thousands, of BTUs. For many years, manufacturers of water heaters have sought to increase the efficiency of the exchange of this heat energy from burned fuel to the water contained in the water heater. Accordingly, maximized heat exchange efficiency has long been sought by commercial and residential water heater manufacturers.

As heat exchange efficiency increases, however, such increased efficiency gives rise to the problems associated with condensation of water vapor from the products of combustion. More specifically, upon burning of a mixture of fuel and air, water is formed as a constituent of the products of combustion. It is recognized that as the temperature of the combustion gases decreases as the result of successful exchange of heat from the combustion gases to water in the water heater, the water vapor within the combustion gases tends to be condensed in greater quantities. In other words, as the temperature of the combustion gases decreases as a direct result of increasingly efficient exchange of heat energy to the water, the amount of condensate forming on the heat exchange surfaces also increases.

Such condensate is typically acidic, with pH values often in the range of between about 2 to 5. The formation of increased amounts of such acidic condensate, even in relatively small quantities, can accelerate the corrosion of heat exchange tubing, increase oxidation and scale formation, reduce heat exchange efficiency and contribute to failure of the water heater.

Commercial and residential water heaters can be designed to operate below the efficiencies at which increased quantities of condensate are likely to form (i.e., below the condensing mode) so that acidic products of combustion are discharged in vapor form in higher temperature exhaust gas. To do so, however, compromises the efficiency of the water heater.

Accordingly, there continues to be a need to manage one or more of these problems associated with the condensation formed by condensing water heaters.

SUMMARY OF THE INVENTION

In one exemplary embodiment, this invention provides a water heater comprising a water tank and a flue extending through an interior of the water tank and configured to transfer heat from combustion products in the flue to water in the water tank. An exhaust passageway is positioned downstream of the flue and extending outside of the water tank to exhaust the combustion products. The exhaust passageway includes a first portion and a second portion positioned at an elevation above the first portion. A bypass conduit is coupled to the exhaust passageway and positioned to direct condensate in the exhaust passageway from the second portion toward the first portion. A drain port is positioned at or an elevation below the first portion of the exhaust passageway to drain condensate from the exhaust passageway.

In another exemplary embodiment, a system for draining condensate from a water heater is provided. The system comprises an exhaust passageway coupled to a flue of the water heater and positioned outside of a water tank of the water heater to exhaust combustion products. The exhaust passageway includes a first portion and a second portion positioned at an elevation above the first portion. A bypass conduit is coupled to the exhaust passageway and positioned to direct condensate in the exhaust passageway from the second portion toward the first portion. A drain port is positioned at the first portion of the exhaust passageway for discharging condensate from the system.

In yet another exemplary embodiment, a method of configuring a water heater for the drainage of condensate from combustion products is provided. The method comprises the step of coupling a bypass conduit to extend between a first portion of the exhaust passageway and a second portion of the exhaust passageway positioned at an elevation above the first portion. A drain is positioned at the first portion of the exhaust passageway for draining condensate from the exhaust passageway.

In still another exemplary embodiment, a method of draining condensate from a water heater is provided. The method comprises the step of delivering combustion products through the flue. Combustion products are exchanged from the flue through an exhaust passageway downstream of the flue and outside of the water tank. Condensate is distributed from a high elevation portion of the exhaust passageway to a low elevation portion of the exhaust passageway. Condensate is drained through a drain port positioned in the low elevation portion of the exhaust passageway.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE DRAWINGS

Figure 1:
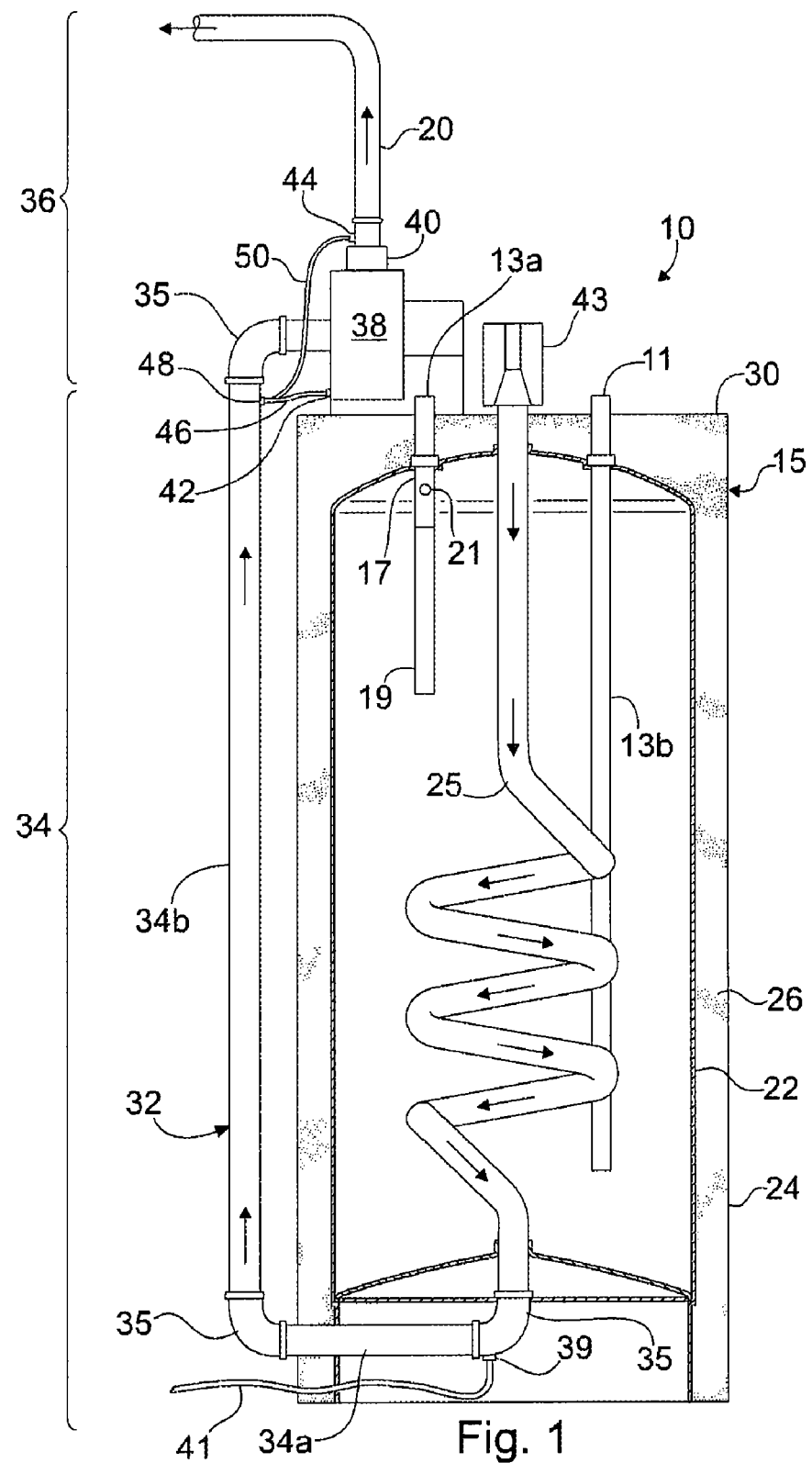
FIG. 1 is a cross-sectional elevation view of an exemplary embodiment of a water heating system according to aspects of this invention.

Exemplary features of selected embodiments of this invention will now be described with reference to the figures. It will be appreciated that the spirit and scope of the invention is not limited to the embodiments selected for illustration. Also, it should be noted that the drawings are not rendered to any particular scale or proportion. It is contemplated that any of the exemplary configurations and materials and sizes described hereafter can be modified within the scope of this invention.

Referring generally to the figures and according to one exemplary embodiment of the invention, a water heater 15, 115, 215 comprises a water tank 22 and a flue 25, 125, 225 extending through an interior of the water tank 22 and configured to transfer heat from combustion products in the flue 25, 125, 225 to water in the water tank 22. An exhaust passageway 32, 132, 232 is positioned downstream of the flue 25, 125, 225 and extending outside of the water tank 22 to exhaust the combustion products. The exhaust passageway 32, 132, 232 includes a first portion 34, 134, 234 and a second portion 36, 136, 236 positioned at an elevation above the first portion 34. A bypass conduit 46 and/or 50, 146 and/or 150, 246 and/or 250 is coupled to the exhaust passageway 32, 132, 232 and positioned to direct condensate in the exhaust passageway 32, 132, 232 from the second portion 36, 136, 236 toward the first portion 34, 134, 234. A drain port 39, 139, 239 is positioned at or an elevation below the first portion 34, 134, 234 of the exhaust passageway 32, 132, 232 to drain condensate from the exhaust passageway 32, 132, 232.

In another exemplary embodiment, a system for draining condensate from a water heater 15, 115, 215 is provided. The system comprises an exhaust passageway 32, 132, 232 coupled to a flue 25, 125, 225 of the water heater 15, 115, 215 and positioned outside of a water tank 22 of the water heater 15, 115, 215 to exhaust combustion products. The exhaust passageway 32, 132, 232 includes a first portion 34, 134, 234 and a second portion 36, 136, 236 positioned at an elevation above the first portion 34, 134, 234. A bypass conduit 46 and/or 50, 146 and/or 150, 246 and/or 250 is coupled to the exhaust passageway 32, 132, 232 and positioned to direct condensate in the exhaust passageway 32, 132, 232 from the second portion 36, 136, 236 toward the first portion 34, 134, 234. A drain port 39, 139, 239 is positioned at the first portion 34, 134, 234 of the exhaust passageway 32, 132, 232 for discharging condensate from the system.

In yet another exemplary embodiment, a method of configuring a water heater 15, 115, 215 for the drainage of condensate from combustion products is provided. The method comprises the step of coupling a bypass conduit 46 and/or 50, 146 and/or 150, 246 and/or 250 to extend between a first portion 34, 134, 234 of the exhaust passageway 32, 132, 232 and a second portion 36, 136, 236 of the exhaust passageway 32, 132, 232 positioned at an elevation above the first portion. A drain 39, 139, 239 is positioned at the first portion 34, 134, 234 of the exhaust passageway 32, 132, 232 for draining condensate from the exhaust passageway 32, 132, 232.

In still another exemplary embodiment, a method of draining condensate from a water heater 15, 115, 215 is provided. The method comprises the step of delivering combustion products through the flue 25, 125, 225. Combustion products are exchanged from the flue 25, 125, 225 through an exhaust passageway 32, 132, 232 downstream of the flue 25, 125, 225 and outside of the water tank 22. Condensate is distributed from a high elevation portion 36, 136, 236 of the exhaust passageway 32, 132, 232 to a low elevation portion 34, 134, 234 of the exhaust passageway 32, 132, 232. Condensate is drained through a drain port 39, 139, 239 positioned in the low elevation portion 34, 134, 234 of the exhaust passageway 32, 132, 232.

Referring now to FIG. 1, a residential gas-fired water heating system embodying exemplary aspects of this invention is generally designated by the numeral "10." In the residential water heating system, a water heater 15 is attached to a gas supply line (not shown) and an exhaust vent 20. The gas supply line supplies natural gas to the water heater 15 for combustion, and the exhaust vent 20 provides a conduit for exhausting the products of combustion from the water heater 15. The exhaust vent 20 may be integrated with the residential structure, or integrated with the water heater 15.

The gas-fired water heater 15 comprises a water tank 22 for containing water, an outer shell 24 for encapsulating the water tank 22, and an annular cavity formed between the water tank 22 and the outer shell 24. Foam insulation 26 is positioned in the annular cavity to limit the escapement of thermal energy from the water storage tank 22 to the surrounding environment. A top cover 30 is fastened to the outer shell 24, thereby enclosing the top surface of the water storage tank 22. The top cover 30 includes apertures for accommodating a flue 25, a cold water inlet port 11 and a hot water outlet port 13*a*.

The cold water inlet port 11 is coupled to an unheated water supply line (not shown). In practice, unheated water is introduced into the water heater 15 through the cold water inlet port 11. An inlet diptube 13*b* is coupled to the inlet port 11 and positioned within the water tank 22 for delivering unheated water into the bottom end of the water tank 22.

The outlet port 13*a* of the water heater 15 is coupled to a heater water supply line (not shown) for distributing heated water from the tank 22. An outlet diptube 17 is coupled to an opposing end of the outlet port 13*a* and positioned within the water tank 22. The outlet dip tube 17 includes a circular inlet port 21 for drawing heated water from the top end of the water tank 22. The heated water is ultimately distributed through the heated water supply line to one or more hot water distribution points. A sacrificial anode rod 19 is coupled to the end of the outlet diptube 17. The anode rod 19 is configured for limiting corrosion of the metallic water tank 22.

According to this exemplary embodiment, the water heater 15 is gas-fired. As will be appreciated by those skilled in the art, the invention disclosed herein is not limited to gas-fired water heaters. Many of the details of this invention may also apply to oil-fired water heaters, or any other type of heat exchanger or insulated tank. Furthermore, although reference is made to "residential" water heaters, the descriptions herein also apply to commercial, industrial or domestic water heaters as well as other heat transfer systems.

According to one aspect of the invention, the water heater 15 includes a burner 43 for producing products of combustion. The gas burner 43 is optionally positioned at an elevation above the water storage tank 22. The gas burner 43 receives gas via a conduit (not shown). The burner 43 is positioned to deliver the products of combustion of the gas and air into the flue 25. Although various burners may be selected for use in the water heater 15, one exemplary burner is a radial burner such as those provided by Beckett Gas Incorporated of North Ridgeville, Ohio.

The flue 25 is positioned to receive the products of combustion from the burner 43. Arrows in FIG. 1 indicate the flow of combustion products through the flue 25. The flue 25 is positioned at least partially within the interior of the tank 22 for heat exchange between the products of combustion and the water within the water tank 22. The flue 25 optionally extends along the entire height of the water tank 22 or along a portion of the height of the water tank 22, as shown in FIG. 1. The flue 25 may optionally include a helical portion (as shown) for increased heat transfer surface area with the water in the water tank 22. Those skilled in the art will recognize that the overall shape, cross-sectional shape, size and position of the flue may vary without departing from the spirit or scope of the invention.

An exhaust passageway 32 is coupled to the outlet end of the flue 25 for receiving the combustion products. According to one aspect of the invention, the exhaust passageway 32 extends between the flue 25 and the exhaust vent 20. The exhaust passageway 32 is positioned downstream of the flue 25 and extends outside of the water tank 22 for exhausting the combustion products to the exhaust vent 20. The exhaust passageway 32 includes a first portion 34, a second portion 36 positioned at an elevation below the first portion 34, and three ninety degree elbows 35.

The first portion 34 includes a substantially horizontal tube 34A positioned at an elevation below the water tank 22, and a vertical tube 34B coupled to horizontal tube 34A at an elbow 35. The vertical tube 34B is substantially vertical and extends along the entire height dimension of the water tank 22. The horizontal tube 34A of the first portion 34 is the lowest elevation point of the exhaust passageway 32. Accordingly, any condensation formed within the flue 25 descends into the first portion 34 under gravity. While most of the condensation forms along the surfaces of the flue 25, the condensation may also form along the exhaust passageway 32. Condensation formed within the substantially vertical tube 34B descends into the horizontal tube 34A under gravity.

A drain port 39 is positioned at or on the horizontal tube 34A of the exhaust passageway 32 for draining or otherwise expelling or discharging condensate from the flue 25 and the exhaust passageway 32. According to one aspect of the invention, the drain port 39 is positioned at the lowest elevation of the exhaust passageway 32. A drain tube 41 is coupled to the drain port 39 for delivering the condensate from the first portion 34 under gravity. Although not shown, the free end of the drain tube 41 may be connected to a drain for disposal or an open container for evaporation or to a pump or sump or other means for disposing of the condensate.

The second portion 36 of the exhaust passageway 32 includes a blower 38, a condensate collector 40, and an exhaust vent 20. Alternatively, the exhaust vent 20 may be part of the residential structure, and, therefore, not a component of the second portion 36. The inlet of the blower 38 is coupled to the vertical tube 34B by an elbow 35 for receiving combustion products. The outlet of the blower 38 is coupled to the exhaust vent 20 for delivering the combustion products into the exhaust vent 20.

The blower 38 is configured to urge the combustion products through the flue 25 and the first portion 34 of the exhaust passageway 32 and into the exhaust vent 20. The blower 38 may be commonly referred to in the art as an inducer or draft inducer. The blower 38 is optionally positioned at an elevation above or coincident with the top end of the water heater 15; however, the blower 38 may be positioned at any selected elevation.

In practice, the blower 38 maintains a negative pressure (with respect to atmospheric pressure) within the flue 25 and the first portion 34 of the exhaust passageway 32 to urge the products of combustion from the burner 43 into the flue 25 and the first portion 34. The blower 38 concurrently maintains a positive pressure (with respect to atmospheric pressure) within the second portion 36 of the exhaust passageway 32 to urge the products of combustion through the exhaust vent 20.

The blower 38 generally includes an inlet port for coupling with the first portion 34, an outlet port for coupling with the condensate collector 40, and an internal impeller (not shown) for urging the flow of combustion products from the inlet port to the outlet port. The blower 38 also includes a condensate outlet port 42 for draining condensation collected in the blower 38. In the absence of the condensate outlet port 42 condensation would accumulate in the blower 38, which could potentially be harmful to the blower 38.

The blower 38 is an integral component of the exhaust system. A suitable blower 38 is manufactured and distributed by the Fasco Corporation of Eaton Rapids, Mich., USA, for example.

The horizontal tube 34A, the vertical tube 34B, the blower 38, the condensate collector 40, and the exhaust vent 20 together define an exhaust passageway 32 that extends from the flue 25 of the water heater to the atmosphere. The blower 38 and the condensate collector 40 are positioned along the exhaust passageway 32. The exhaust passageway 32 may be an integral component of the water heater 15 that is supplied along with the water heater 15.

According to another exemplary embodiment of the invention, the exhaust vent 20 is part of the residential structure and not a component of the exhaust passageway 32. Accordingly, the horizontal tube 34A, the vertical tube 34B, the blower 38, and the condensate collector 40 together define an exhaust passageway 32 that extends from the flue 25 of the water heater to the exhaust vent 20.

According to one aspect of the invention, the water heater 15 includes a bypass conduit 46 for delivering condensate collected in the blower 38 to the exhaust passageway 32. One end of the bypass conduit 46 is coupled to the condensate outlet port 42 and the opposing end of the bypass conduit 46 is coupled to a condensate inlet port 48 positioned on the first portion 34 of the exhaust passageway 32. The condensate inlet port 48 may be positioned on the vertical tube 34B (as shown in FIG. 1), the horizontal tube 34A of the first portion 34 of the exhaust passageway 32, or at any elevation below the condensate outlet port 42.

The bypass conduit 46 is suspended between the condensate outlet port 42 and the condensate inlet port 48. Because the condensate outlet port 42 is positioned at a higher elevation than the condensate inlet port 48, condensate pooled in the blower 38 is urged to flow through the bypass conduit 46 under gravity. In practice, condensate delivered into the first portion 34 through the condensate inlet port 48 descends into the horizontal tube 34A under the influence of gravity. The condensate is ultimately expelled through the drain port 39 and into the drain tube 41.

Since the exhaust vent 20 is generally maintained at a lower temperature than the combustion gases in the exhaust vent 20, the exhaust vent 20 accelerates the condensing process. Accordingly, it is desirable to remove the highly acidic condensation from the exhaust vent 20. Removal of the condensation from the exhaust vent 20 is achieved by draining condensation from the lowest elevation point of the exhaust vent 20. More particularly, a condensate collector 40 is positioned at the lowest elevation of the exhaust vent 20. The condensate collector 20 is coupled to the exhaust passageway 32 between the outlet port of the blower 38 and the exhaust vent 20.

The condensate collector 40 is generally configured to (1) permit the flow of combustion products between the blower 38 and the exhaust vent 20, and (2) collect condensate that descended down the exhaust vent 20 under gravity. The condensate collector 40 is positioned to prevent or limit the introduction of highly acidic condensate through the outlet port of the blower 38. It is envisioned that the highly acidic condensate could degrade the performance of the blower 38 if the condensate was permitted to reside on the surfaces of the blower impeller or the internal fluid passageway of the blower 38 for an extended period of time.

Although not shown, the condensate is collected in an internal cavity of the condensate collector 40. A condensate outlet port 44 is provided on a side surface of the condensate collector 40 for expelling the condensate from the internal cavity (not shown) of the condensate collector 40.

The water heater 15 includes a bypass conduit 50 for delivering condensate collected in the condensate collector 40 to the exhaust passageway 32. One end of the bypass conduit 50 is coupled to the condensate outlet port 44 and the opposing end of the bypass conduit 50 is coupled to the condensate inlet port 48 positioned on the first portion 34 of the exhaust passageway 32. Both bypass conduits 46 and 50 may be coupled to the condensate inlet port 48, or alternatively, the bypass conduit 50 may be coupled to a separate condensate inlet port positioned on the first portion 34 of the exhaust passageway 32.

The bypass conduit 50 is suspended between the condensate outlet port 44 and the condensate inlet port 48. Because the condensate outlet port 44 is positioned at a higher elevation than the condensate inlet port 48, condensate pooled in the condensate collector 40 is urged to flow through the bypass conduit 50 under gravity. In practice, condensate delivered into the condensate inlet port 48 of the vertical tube 34B descends into the horizontal tube 34A under gravity. The condensate is ultimately expelled through the drain port 39 and into the drain tube 41.

The condensate collector 40 is an integral component of the exhaust passageway 32. A suitable condensate collector 40 is manufactured and distributed by Regal Beloit, of Beloit, Wis., USA, for example, and described in U.S. Pat. No. 6,536,378 to Lyons, which is incorporated herein by reference in its entirety.

According to one aspect of the invention, the water heater 15 includes a system for draining condensate. The system generally includes the exhaust passageway 32, the bypass conduits 46 and/or 50, and the drain port 39. The exhaust passageway 32 is coupled to the flue 25 and positioned outside of the water tank 22 for exhausting combustion products. The bypass conduits 46 and/or 50 are coupled to the exhaust passageway 32 for distributing condensate from the second portion 36 of the exhaust passageway 32 towards the first portion 34 of the exhaust passageway 32. The drain port 39 is positioned at the first portion 34 of the exhaust passageway 32 for expelling condensate from the system.

Figure 2:
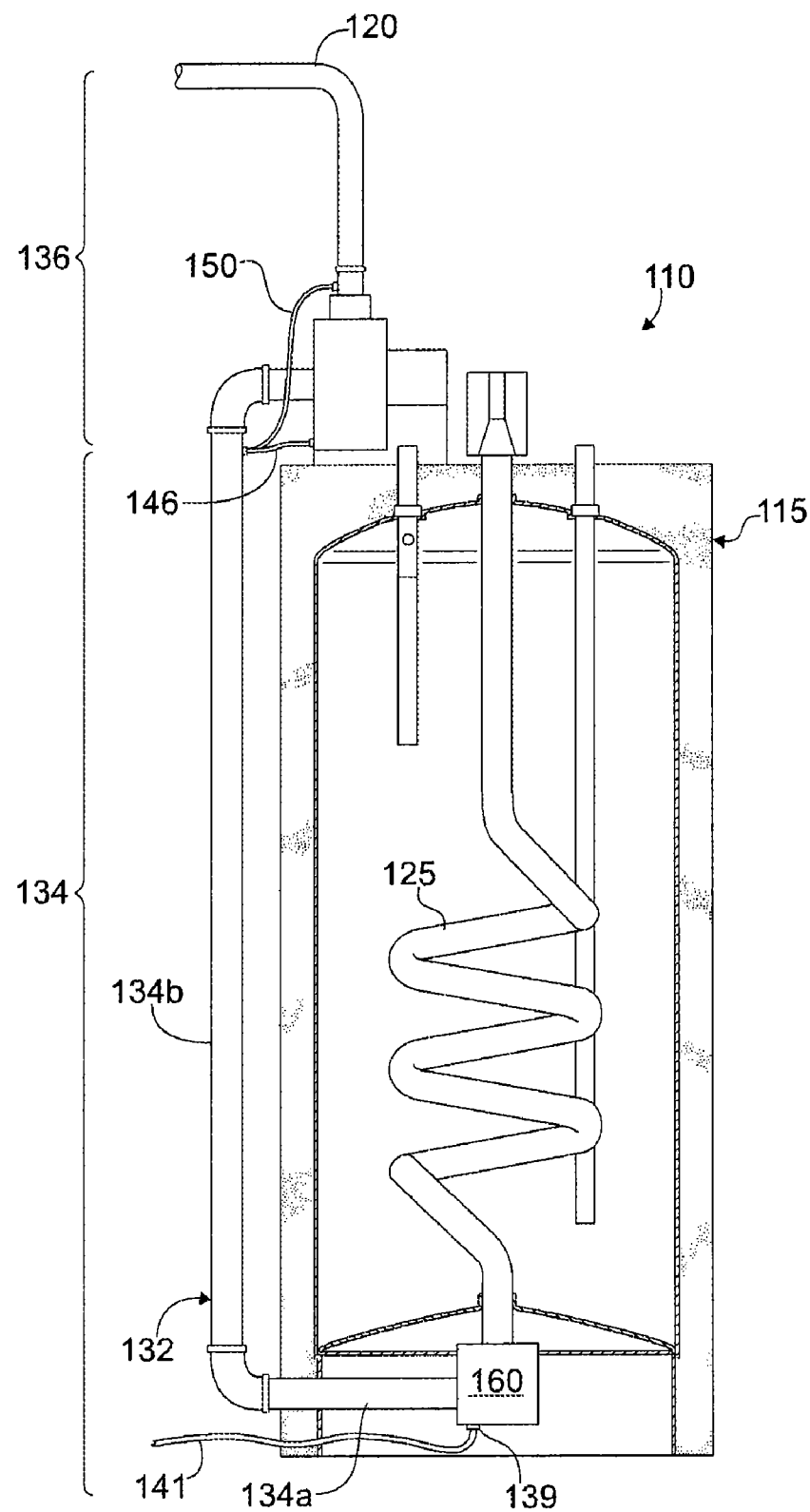
FIG. 2 is a cross-sectional elevation view of another exemplary embodiment of a water heating system, wherein the water heater includes a condensation collector, according to aspects of this invention.

FIG. 2 depicts an alternative exemplary embodiment of a water heating system 110. The water heating system 110 illustrated in FIG. 2 is substantially similar to the water heating system 10 illustrated in FIG. 1, with the exception that the water heater 115 includes a collection device 160. The collection device 160 is coupled between the outlet end of the flue 125 and the inlet end of the horizontal tube 134A of the first portion 134 of the exhaust passageway 132.

The collection device 160 is configured to separate condensation and combustion gases. More particularly, the collection device 160 permits the passage of combustion products therethrough, such that the combustion gases are ultimately distributed into the exhaust passageway 132 and the exhaust vent 120. The collection device 160 includes an interior cavity (not shown) for collecting condensation. A drain tube 141 is coupled to a condensate outlet port 139 provided in the bottom end of the collection device 160. The collector device 160 could be a box or an elbow or any container capable of holding a volume of liquid and directing the liquid to the lowest elevation within the device where a drain or external access port is preferably located.

In practice, condensation descends from the flue 125, the second portion 136 (via the bypass conduits 146 and 150), and the vertical tube 134B of the exhaust passageway 132 and into the collection device 160 under the influence of gravity. The condensate collects in the interior cavity of the collection device 160, and is expelled through the condensate outlet port 139 into the drain tube 141.

Figure 3:
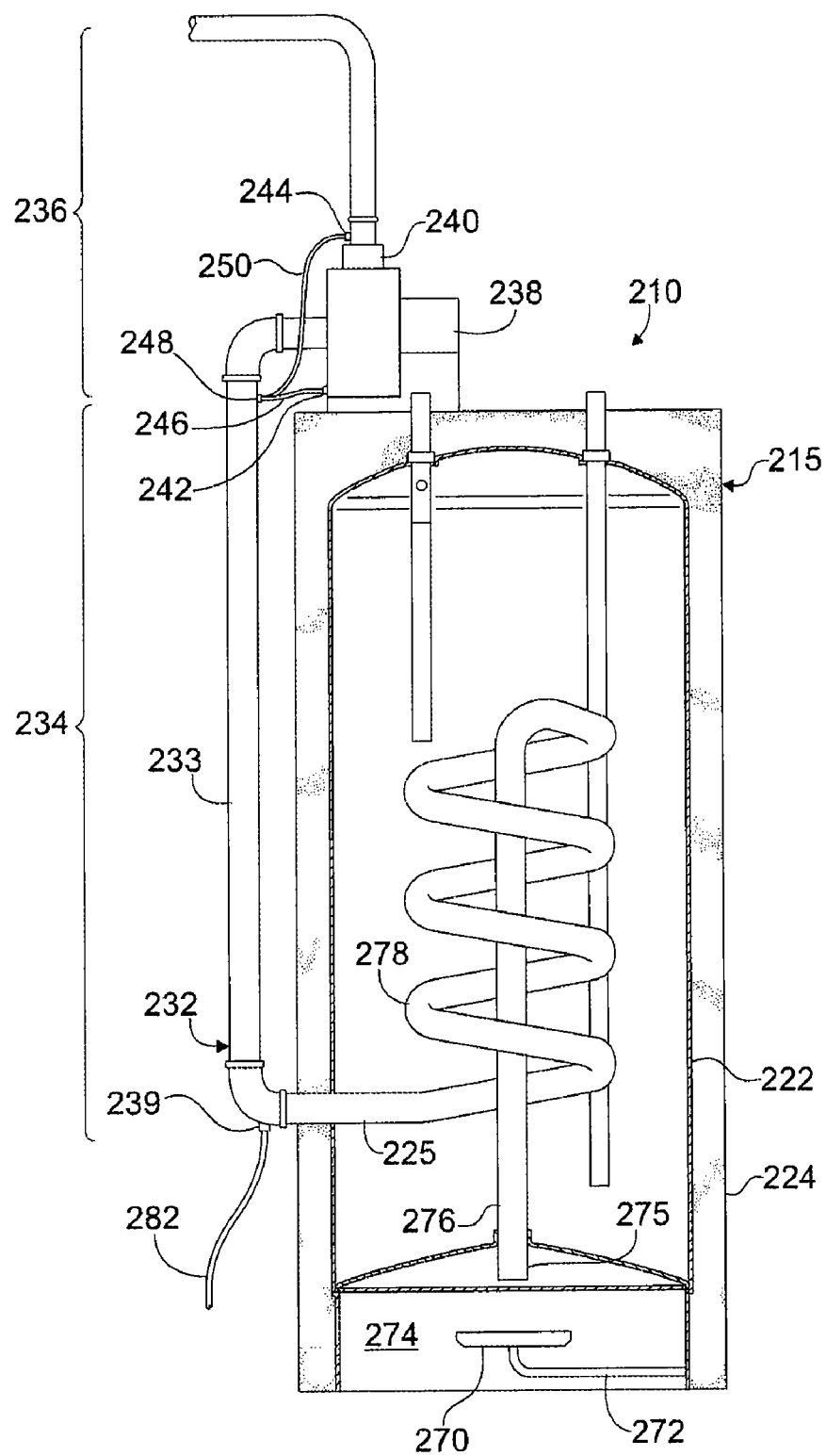
FIG. 3 is a cross-sectional elevation view of yet another exemplary embodiment of a water heating system, wherein the water heater includes a combustion chamber, according to aspects of this invention.

FIG. 3 depicts another alternative exemplary embodiment of a water heating system 210. The water heating system 210 illustrated in FIG. 3 is substantially similar to the water heating system 10 illustrated in FIG. 1, however the water heater 215 includes a combustion chamber 274 positioned beneath the water tank 222.

The water heater 215 generally includes a water tank 222 for containing water, an outer shell 224 for encapsulating the water tank 222, and a flue 225 positioned within the water tank 222 for distributing combustion products for heat exchange with water in the water tank 222. A burner 270 is positioned beneath the water tank 222 in a combustion chamber 274 for producing combustion products. The burner 270 receives gas via a conduit 272 coupled to a gas source (not shown). The combustion chamber 274 directs the combustion products into the inlet end 275 of the flue 225.

The flue 225 is positioned within the water tank 222 for distributing combustion products for heat exchange with water in the water tank 222. The flue 225 includes a substantially vertical portion 276 and a helical portion 278 extending from the substantially vertical portion 276. The end of the helical portion 278 extends outside of the water heater 215 for connection to the exhaust passageway 232. Accordingly, the water tank 222 and the outer shell 224 include apertures for accommodating the helical portion 278 of the flue 225.

The blower 238 urges the products of combustion through the flue 225 and the exhaust passageway 232, as described with reference to FIG. 1. The exhaust passageway 232 includes a first portion 234 and a second portion 236 positioned at an elevation above the first portion 234. A bypass conduit 246 extends between the condensate outlet port 242 of the blower 238 and the condensate inlet port 248 of the first portion 234 of the exhaust passageway 232 for distributing condensate from the blower 238 to the exhaust passageway 232. Similarly, a bypass conduit 250 extends between the condensate outlet port 244 of the condensate collector 240 and the condensate inlet port 248 of the exhaust passageway 232 for distributing condensate from the condensate collector 240 to the exhaust passageway 232.

The condensate is ultimately expelled along the substantially vertical portion 233 of the exhaust passageway 232 and through a drain port 239 positioned at the lowest elevation of the exhaust passageway 232 under gravity. A drain tube 282 is connected to the drain port 239 for ultimate removal of the condensate.

Referring back to FIG. 1 and according to one aspect of the invention, a method of draining condensate from a water heater 15 is described hereinafter. It should be understood that the method described hereinafter is not limited to any particular step, or particular order or sequence of steps. The method of draining condensate includes the step of delivering combustion products through the flue 25 positioned within the water tank 22 to transfer heat from the combustion products to water in the water tank 22. The combustion products are then delivered through an exhaust passageway 32 downstream of the flue 25 and outside of the water tank 22 to exhaust the combustion products. Condensate formed from the combustion products are delivered from the second portion 36 of the exhaust passageway 32 toward a first portion 34 of the exhaust passageway 32. The condensate is ultimately expelled through a drain port 39 positioned in a first portion 34 of the exhaust passageway 32. While the above method was described with reference to FIG. 1, it should be understood that the method also applies to FIGS. 2 and 3.

Referring still to FIG. 1 and according to one aspect of the invention, a method of assembling a water heater 15 is described hereinafter. It should be understood that the method described hereinafter is not limited to any particular step, or particular order or sequence of steps. The method of assembly includes the step of extending a flue 25 through an interior of a water tank 22 so as to transfer heat from the combustion products to water in the water tank. An exhaust passageway 32 is positioned downstream of the flue 25 and outside of the water tank 25 to exhaust the combustion products. A bypass conduit 46 and/or 50 is coupled to the exhaust passageway 32 to distribute condensate from a second portion 36 of the exhaust passageway 32 towards the first portion 34 of the exhaust passageway 32. A drain port 39 is positioned at the first portion 34 of the exhaust passageway 32 to drain condensate from the exhaust passageway 32.

The step of coupling a bypass conduit 46 to the exhaust passageway 32 is described in greater detail hereinafter. A blower 38 is coupled in fluid communication with the exhaust passageway 32, wherein the blower 38 includes a condensate outlet port 42 for draining condensation. The bypass conduit 46 is coupled between the condensate outlet port 42 of the blower 38 and a condensate inlet port 48 positioned on the exhaust passageway 32 for distributing condensate from the blower 38 to the exhaust passageway 32.

The step of coupling a bypass conduit 50 to the exhaust passageway 32 is described in greater detail hereinafter. A condensate collector 40 is coupled in fluid communication with the exhaust passageway 32, wherein the condensate collector 40 includes a condensate outlet port 44 for draining condensation from the exhaust vent 20. The bypass conduit 50 is coupled between the condensate outlet port 44 of the condensate collector 40 and a condensate inlet port 48 positioned on the exhaust passageway 32 for distributing condensate from the condensate collector 40 to the exhaust passageway 32. While the above method was described with reference to FIG. 1, it should be understood that the method also applies to FIGS. 2 and 3.

The water heating systems 10, 110 and 210 disclosed herein provide efficient management and disposal of condensate generated by a water heater. Although condensate-producing water heaters may optionally include multiple drain ports for disposing of condensate collected at various locations in an exhaust system, the water heating systems 10, 110 and 210 optionally provide one drain port (e.g., drain port 39) to drain condensate collected at various locations in an exhaust system, rather than requiring multiple drain ports. Additionally, the water heating systems 10, 110 and 210 utilize gravity to assist with the management and disposal of condensate at various locations in an exhaust system, as opposed to relying on a pump system.

Although this invention has been described with reference to exemplary embodiments and variations thereof, it will be appreciated that additional variations and modifications can be made within the spirit and scope of this invention. Although this invention may be of particular benefit in the field of residential water heaters, it will be appreciated that this invention can be beneficially applied in connection with commercial or domestic water heaters and other heating systems as well.

What is claimed:

1. A water heater comprising:
a water tank;
a flue extending through an interior of said water tank and configured to transfer heat from combustion products in the flue to water in said water tank;
an exhaust passageway positioned downstream of the flue and extending outside of said water tank to exhaust the combustion products, said exhaust passageway including a first portion and a second portion positioned at an elevation above said first portion;
a bypass conduit coupled to said exhaust passageway and positioned to direct condensate in said exhaust passageway from said second portion toward said first portion; and
a drain port positioned at or at an elevation below said first portion of said exhaust passageway to drain condensate from said exhaust passageway.

2. The water heater of claim 1 further comprising a blower coupled to the exhaust passageway and positioned to urge the combustion products through the exhaust passageway, said blower including a condensate outlet port for draining condensate.

3. The water heater of claim 2 wherein the bypass conduit extends between the condensate outlet port of the blower and a condensate inlet port positioned on the exhaust passageway.

4. The water heater of claim 3 wherein the condensate inlet port is positioned at said first portion of said exhaust passageway.

5. The water heater of claim 1, said first portion of said exhaust passageway including a substantially vertical portion to induce a flow of condensate to said drain port under the influence of gravity.

6. The water heater of claim 1 further comprising a condensate collector coupled to said exhaust passageway and configured to collect condensate formed in said exhaust passageway and direct the condensate to a condensate outlet port.

7. The water heater of claim 6 said bypass conduit extending between the condensate outlet port of the condensate collector and a condensate inlet port positioned on the exhaust passageway.

8. The water heater of claim 6 wherein the condensate inlet port is positioned at said first portion of said exhaust passageway.

9. The water heater of claim 8, said first portion of said exhaust passageway being substantially vertical to induce the flow of condensate from the condensate inlet port to said drain port under gravity.

10. A system for draining condensate from a water heater having a water tank, a burner for producing combustion products, and a flue extending within the water tank for receiving combustion products from the burner and transferring heat from the combustion products to water in the water tank, said system comprising:
an exhaust passageway coupled to the flue and positioned outside of the water tank to exhaust combustion products, said exhaust passageway including a first portion and a second portion positioned at an elevation above said first portion;
a bypass conduit coupled to said exhaust passageway and positioned to direct condensate in said exhaust passageway from said second portion toward said first portion; and
a drain port positioned at or at an elevation below the first portion of said exhaust passageway for discharging condensate from the system.

11. The system of claim 10 further comprising a blower coupled to said exhaust passageway and positioned to urge the combustion products through the exhaust passageway, said blower including a condensate outlet port for draining condensate.

12. The system of claim 11 wherein said bypass conduit is coupled between said condensate outlet port of said blower and a condensate inlet port positioned on said exhaust passageway.

13. The system of claim 10, said condensate inlet port being positioned on said first portion of the exhaust passageway.

14. The system of claim 13, said exhaust passageway including a substantially vertical portion between the condensate inlet port and the drain port to induce a flow of condensate from the condensate inlet port to said drain port under the influence of gravity.

15. The system of claim 10 further comprising a condensate collector coupled to said exhaust passageway and configured to collect condensate formed in the exhaust passageway and direct the condensate to a condensate outlet port.

16. The system of claim 15, said bypass conduit extending between the condensate outlet port of the condensate collector and a condensate inlet port positioned on the exhaust passageway.

17. The system of claim 16 wherein the condensate inlet port is positioned at said first portion of said exhaust passageway.

18. The system of claim 17, said first portion of said exhaust passageway being substantially vertical to induce the flow of condensate from the second condensate inlet port to said drain port under gravity.

19. A method of configuring a water heater for the drainage of condensate from combustion products, the water heater including a flue positioned at least partially within a water tank for receiving combustion products from a burner, and an exhaust passageway coupled to the flue for exhausting the combustion products, said method comprising the steps of:
   coupling a bypass conduit to extend between a first portion of the exhaust passageway and a second portion of the exhaust passageway positioned at an elevation above the first portion; and
   positioning a drain port at or at an elevation below the first portion of the exhaust passageway for draining condensate from the exhaust passageway.

20. The method of claim 19 further comprising the step of coupling a blower in fluid communication with the exhaust passageway, the blower including a condensate outlet port for draining condensation.

21. The method of claim 20 wherein the step of coupling a bypass conduit comprises coupling the bypass conduit between the condensate outlet port of the blower and a condensate inlet port positioned on the exhaust passageway for distributing condensate from the blower to the exhaust passageway.

22. The method of claim 20 further comprising the step of coupling a condensate collector to the exhaust passageway to collect condensate formed in the exhaust passageway and direct the condensate to a condensate outlet port of the condensate collector.

23. The method of claim 22 further comprising the step of coupling a second bypass conduit between the condensate outlet port of the condensate collector and a condensate inlet port positioned on the exhaust passageway.

24. A method of draining condensate from a water heater having a water tank, a burner for producing combustion products, and a flue positioned at least partially within the water tank for receiving combustion products from the burner, the method comprising the steps of:
   delivering combustion products through the flue;
   exhausting combustion products from the flue through an exhaust passageway downstream of the flue and outside of the water tank;
   distributing condensate from a higher elevation portion of the exhaust passageway to a lower elevation portion of the exhaust passageway; and
   draining condensate through a drain port positioned in the lower elevation portion of the exhaust passageway.

* * * * *